United States Patent
Miyazaki et al.

(10) Patent No.: US 8,740,596 B2
(45) Date of Patent: Jun. 3, 2014

(54) TIRE VULCANIZATION MOLD

(75) Inventors: Yusaku Miyazaki, Hiratsuka (JP);
Noboru Takada, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 422 days.

(21) Appl. No.: 13/307,283

(22) Filed: Nov. 30, 2011

(65) Prior Publication Data

US 2012/0148697 A1     Jun. 14, 2012

(30) Foreign Application Priority Data

Dec. 8, 2010   (JP) .................................. 2010-273496

(51) Int. Cl.
*B29C 33/10*     (2006.01)
(52) U.S. Cl.
USPC .............................. 425/28.1; 425/46; 425/812
(58) Field of Classification Search
USPC ..................................... 425/28.1, 35, 46, 812
See application file for complete search history.

(56) References Cited

U.S. PATENT DOCUMENTS

| | | | | |
|---|---|---|---|---|
| 2,756,460 A | * | 7/1956 | Heintz, Jr. ................... | 425/28.1 |
| 3,553,790 A | * | 1/1971 | Brobeck et al. .............. | 425/812 |
| 4,553,918 A | * | 11/1985 | Yoda et al. ................... | 425/46 |
| 7,524,175 B2 | * | 4/2009 | Henrotte et al. ............. | 425/46 |

FOREIGN PATENT DOCUMENTS

| | | | |
|---|---|---|---|
| DE | 1965121 | * | 7/1971 |
| JP | 2005-193577 | * | 7/2005 |
| JP | 2009-269363 A | | 11/2009 |

* cited by examiner

*Primary Examiner* — James Mackey
(74) *Attorney, Agent, or Firm* — Global IP Counselors, LLP

(57) ABSTRACT

A tire vulcanization mold includes an elongated exhaust groove open to a tire molding surface, a plate-like blade inserted in the exhaust groove leaving a small gap between the blade and groove defining surfaces, and an exhaust hole connecting the exhaust groove and mold exterior. The exhaust groove has a length reduced partway in a mold depth direction, and includes upper and shorter lower groove portions positioned on mold surface and back surface sides, respectively, of the mold. The upper groove portion thickness is greater than the blade thickness, and the lower groove portion thickness is less than or equal to the blade thickness. The blade includes a communicating portion connecting the upper and lower groove portions, and abuts against portions of the mold defining a bottom surface of the upper groove portion and edge surfaces of both sides in a thickness direction of the lower groove portion.

20 Claims, 12 Drawing Sheets

TIRE VULCANIZATION MOLD

CROSS-REFERENCE TO RELATED APPLICATIONS

This application claims priority to Japanese Patent Application No. 2010-273496, filed on Dec. 8, 2010, the entire disclosure of Japanese Patent Application No. 2010-273496 is hereby incorporated herein by reference.

BACKGROUND

1. Field of the Invention

The present invention relates to a tire vulcanization mold for vulcanizing green tires.

2. Background Information

When manufacturing a pneumatic tire, a tire vulcanization mold is used to vulcanize a green tire to which tire configuration members are attached. By heating the tire vulcanization mold, the green tire is vulcanized, and a tread pattern is formed in a surface of the tire tread portion by recesses and protrusions provided in a tire molding surface of the tire vulcanization mold.

However, during the vulcanization process, unnecessary air may become trapped in the tire vulcanization mold. Additionally, gas produced as a result of vulcanization can become trapped in the tire vulcanization mold. This air and/or gas exists between the tire molding surface of the tire vulcanization mold and the green tire, which leads to portions of the green tire not being sufficiently heated. As a result, rubber material of the green tire may not flow well and vulcanization defects caused by rubber filling shortages and the like can occur in the surface of the vulcanized tire. Therefore, tire vulcanization molds are provided with exhaust mechanisms for evacuating air or gas produced when vulcanizing out of the mold.

An example of an exhaust mechanism in the tire vulcanization mold is described in Japanese Unexamined Patent Application Publication No. 2009-269363. In this exhaust mechanism, an elongated hole is provided in the tire molding surface of the tire vulcanization mold, and a blade is embedded in the hole. Thereby, the exhaust mechanism has a structure where a small gap is formed between the blade and a long edge of the hole. Air and/or gas is evacuated out of the tire vulcanization mold via this small gap.

The blade used in the tire vulcanization mold described in Japanese Unexamined Patent Application Publication No. 2009-269363 is fixed in the elongated hole and, therefore, is embedded so as to be abutted against a portion of the long edge of the elongated hole. As a result, the small gap is not formed throughout an entire length of the long edge of the elongated hole, and an area of the small gap that opens to the tire molding surface is reduced. Thus, from the perspective of sufficiently utilizing the elongated hole as an exhaust groove, improvements can be made to this type of tire vulcanization mold.

SUMMARY

An object of the present technology is to provide a tire vulcanization mold that can enhance exhausting efficiency of air and/or gas by effectively utilizing an exhaust groove that is formed in the tire molding surface, and embedding a blade in the exhaust groove such that a small gap remains between the blade and the surfaces of the tire vulcanization mold defining the exhaust groove.

One disclosed embodiment provides a tire vulcanization mold for vulcanizing a green tire. The tire vulcanization mold includes a tread mold having a tread molding surface and a side mold having a side wall molding surface. The tread mold includes an elongated exhaust groove formed so as to open to a tire molding surface, a plate-like blade received into the exhaust groove and embedded having a small gap between the blade and a wall of the tread mold defining the exhaust groove, and an exhaust hole connecting the exhaust groove and an exterior of the tire vulcanization mold. Accordingly, by reducing a length dimension of the exhaust groove partway in a mold depth direction, the exhaust groove includes an upper groove portion positioned on a mold surface side of the tire vulcanization mold and a lower groove portion positioned on a mold back surface side of the tire vulcanization mold.

The length dimension of the lower groove portion is shorter than that of the upper groove portion. Also, a thickness dimension of the upper groove portion is greater than a thickness dimension of the blade, and a thickness dimension of the lower groove portion is less than or equal to the thickness dimension of the blade.

When the blade is received and embedded into the exhaust groove, the blade at least is abutted against a bottom surface of the upper groove portion and edge surfaces of both sides in a thickness direction of the lower groove portion. Also, a communicating portion that connects the upper groove portion and the lower groove portion is provided in the blade.

Thus, the tire vulcanization mold according to the disclosed embodiments enhance the exhausting efficiency of air and/or gas from the mold.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1A:
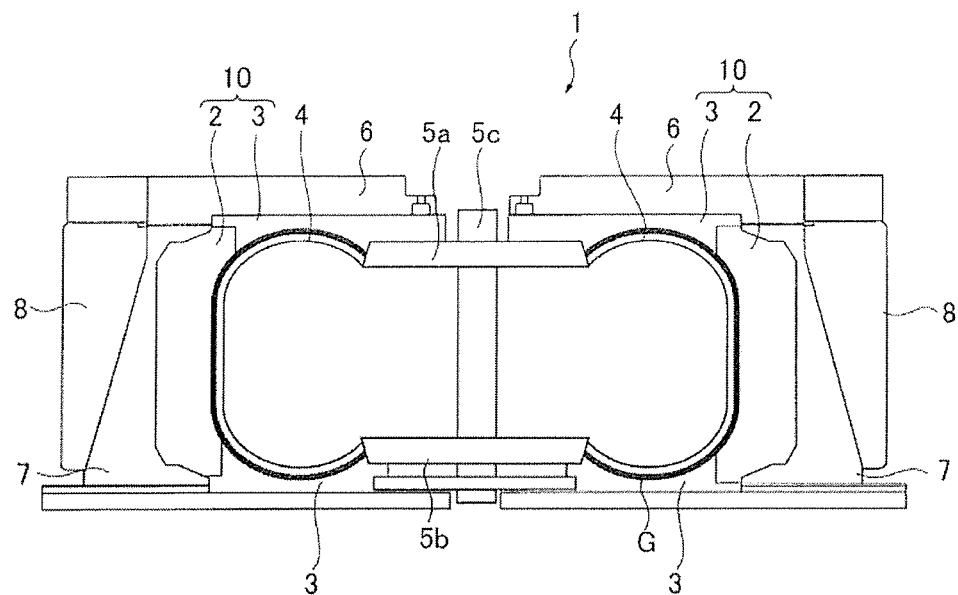
FIG. 1A is an explanatory view illustrating an overview of a tire vulcanization device using a tire vulcanization mold according to a disclosed embodiment.

Tire vulcanization molds according to disclosed embodiments are described in detail below. FIG. 1A is an explanatory view illustrating an overview of a tire vulcanization device using a tire vulcanization mold according to a disclosed embodiment. A tire vulcanization device 1 mainly includes a tread mold 2, a side mold 3, a bladder 4, a top plate 5a, a bottom plate 5b, a shaft 5c, a lift member 6, a support segment 7, and a guide ring 8. Thus, the tire vulcanization mold 10 according to this embodiment includes the tread mold 2 and the side mold 3.

The tread mold 2 has a tread molding surface for vulcanizing a tread portion of a green tire G, and is supported by the support segment 7. The side mold 3 has a side wall molding surface for vulcanizing a side portion of the green tire G. In FIG. 1A, the side mold 3 positioned on a lower side is fixed to the tire vulcanization device 1, and the side mold 3 positioned on an upper side is fixed to the lift member 6. The top plate 5a and the bottom plate 5b are fixed to the shaft 5c, which is provided standing from the tire vulcanization device 1. The bladder 4 is provided at the top plate 5a and the bottom plate 5b. The bladder 4 is a stretchable, thin film-like member formed from rubber or any other suitable material.

When performing a vulcanization process as illustrated in FIG. 1A, the tread mold 2 and the side mold 3 are heated to a temperature of about 170° C. by a heat source (not illustrated). Additionally, the bladder 4 is pressurized and expanded by high-temperature vapor supplied from a supply pipe (not illustrated) of the shaft 5c so as to contact snugly with an inner circumferential surface of the green tire G and pressurize the green tire G in the tire radial direction from the inner circumferential surface. Furthermore, the bladder 4 is configured so as to press the green tire G against the tire molding surfaces of the tread mold 2 and the side mold 3 while expanding the green tire G from the inner circumferential surface thereof. Thus, a tire T is obtained by vulcanizing the green tire G for a predetermined time using the tread mold 2, the side mold 3, and the bladder 4.

Figure 1B:
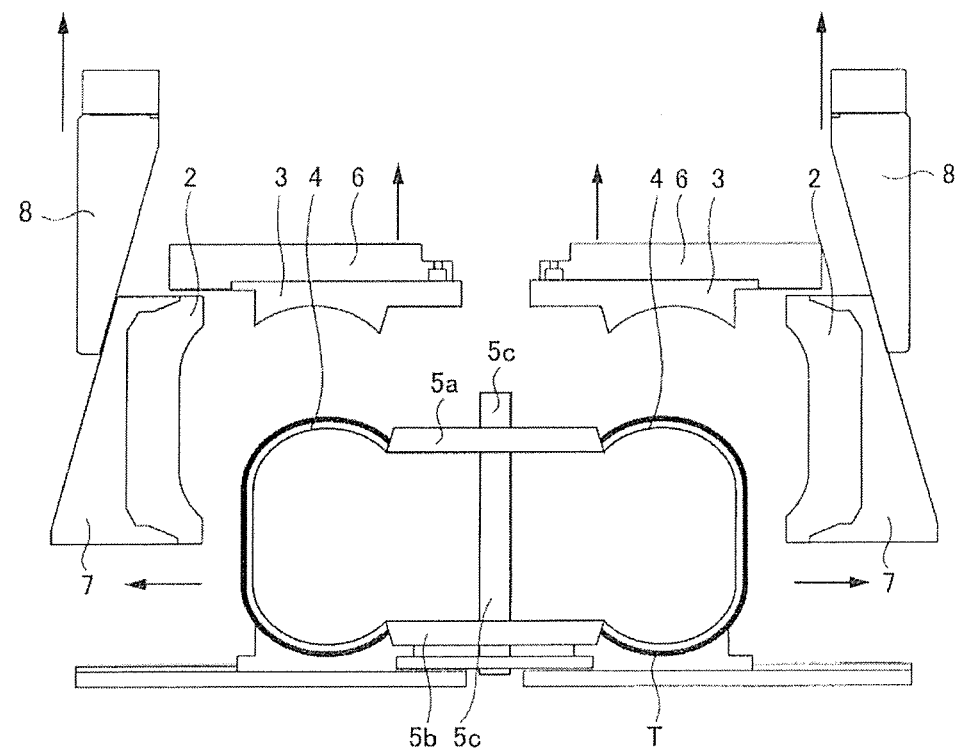
FIG. 1B illustrates the disposal of the tire vulcanization device depicted in FIG. 1A immediately following vulcanization.

FIG. 1B is a drawing illustrating the disposal of the tire vulcanization device 1 immediately following vulcanization. After vulcanization, the lift member 6 is raised via a lift mechanism (not illustrated) and, therewith, the side mold 3 positioned above separates from the vulcanized tire T. Additionally, the support segment 7 moves in an outer side direction together with raising of the guide ring 8. Thereby, the tread mold 2 separates from the vulcanized tire T. Thus, the tire T is removed from the tire vulcanization device.

Figure 2:
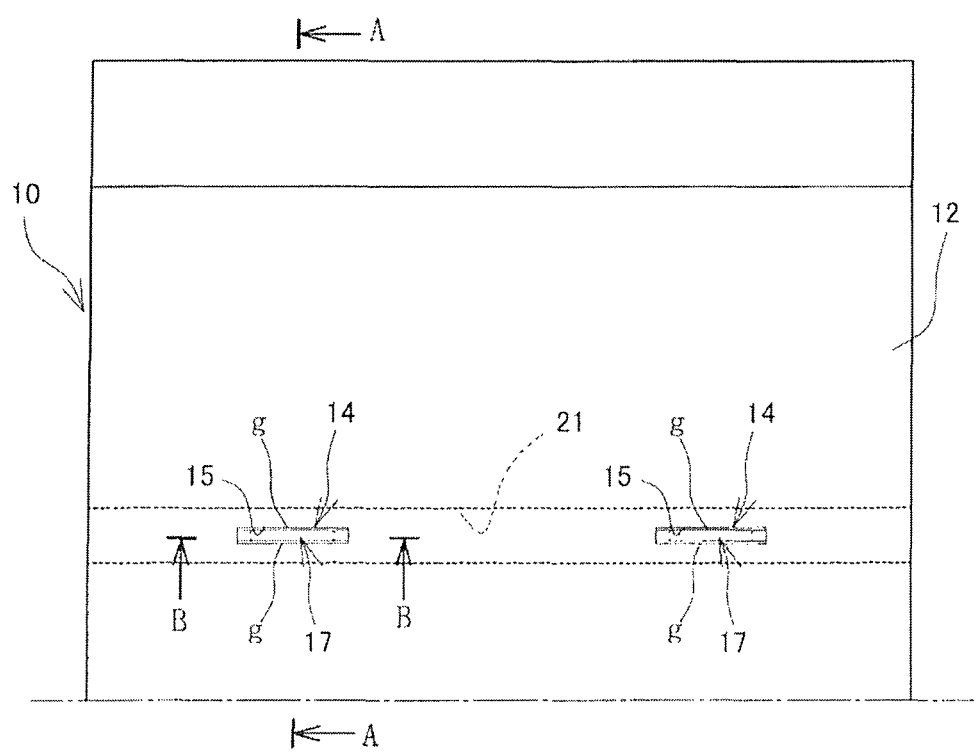
FIG. 2 is a plan view illustrating a portion of a tire molding surface of the tire vulcanization mold used in FIG. 1A.
Figure 3:
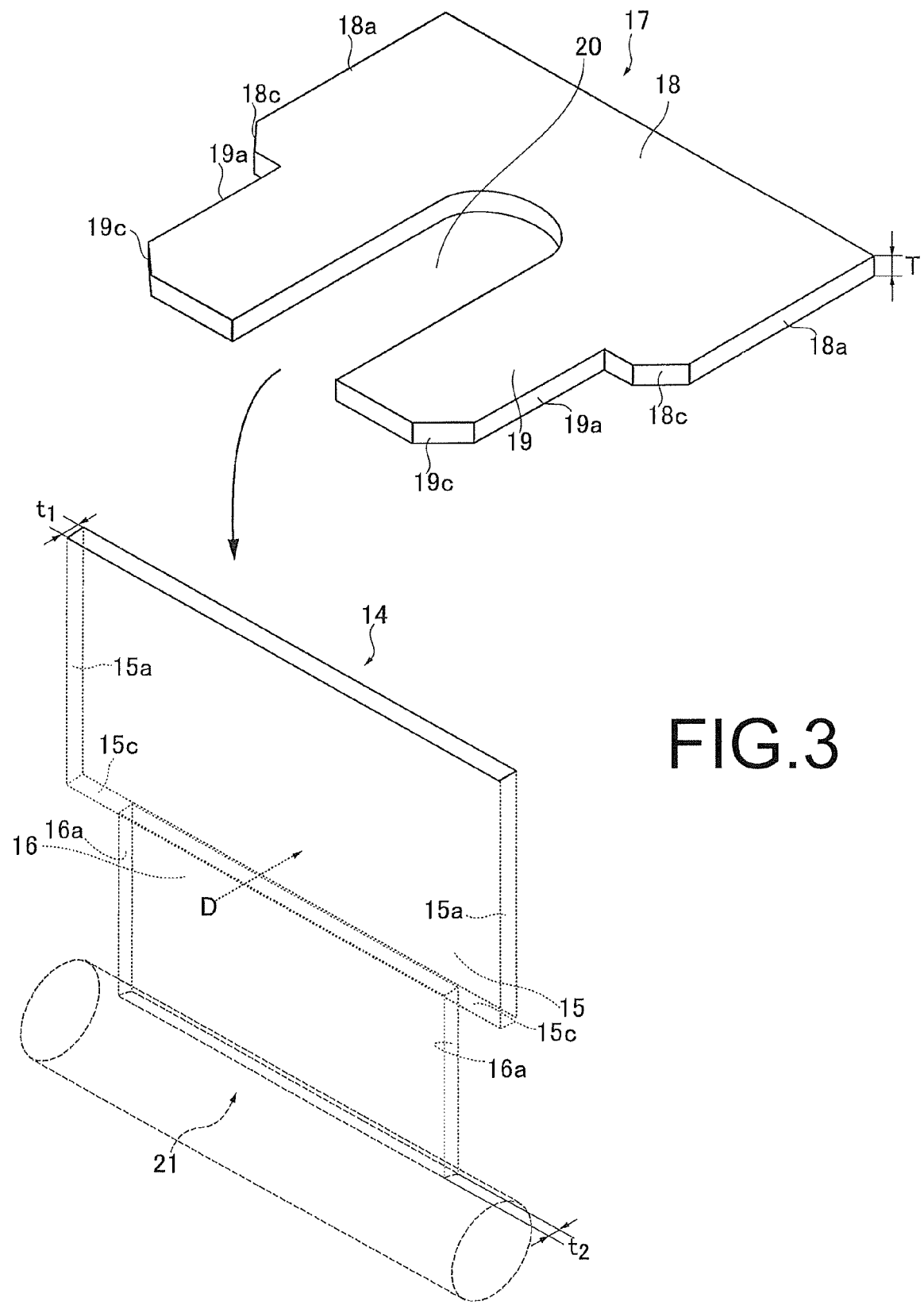
FIG. 3 is a breakdown perspective view illustrating an overview of an exhaust groove and a blade of the tire vulcanization mold depicted in FIG. 2.
Figure 4:
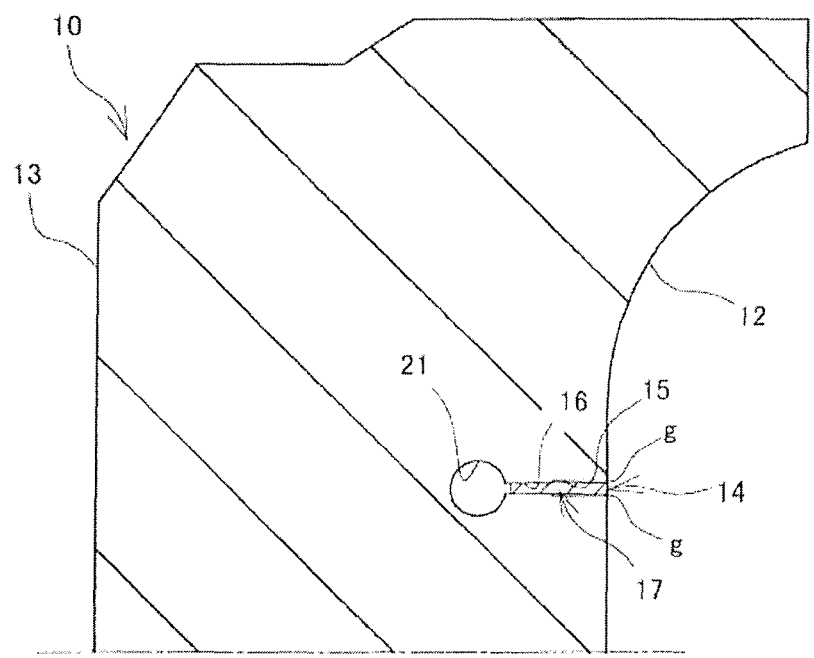
FIG. 4 is a cross-sectional view taken along line A-A of FIG. 2.
Figure 5:
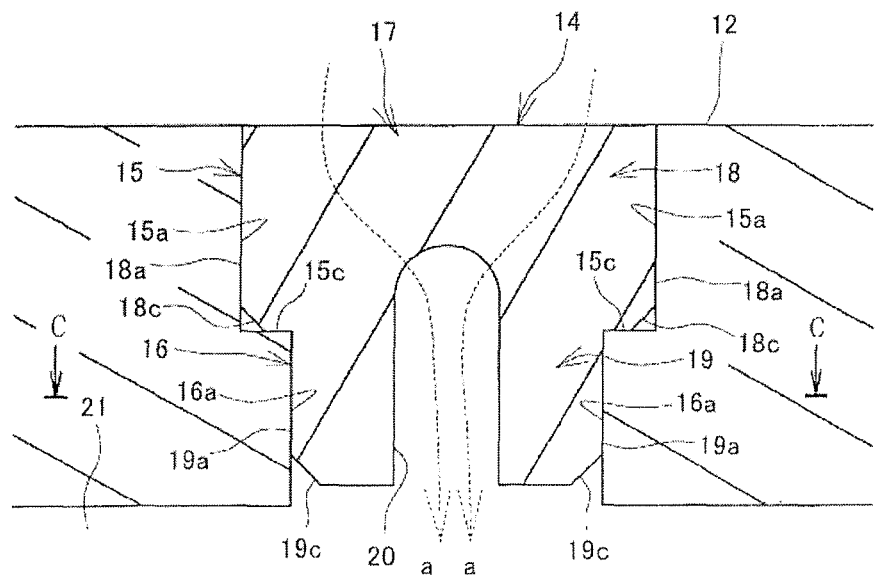
FIG. 5 is a cross-sectional view taken along line B-B of FIG. 2.
Figure 6:
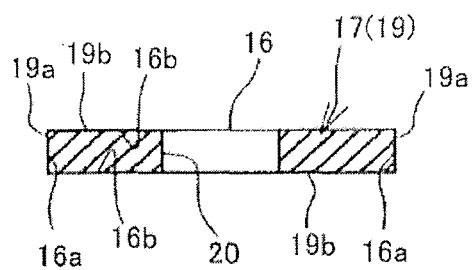
FIG. 6 is a cross-sectional view taken along line C-C of FIG. 5.

FIG. 2 is a plan view illustrating a portion of a tire molding surface of the tire vulcanization mold 10. In FIG. 2, surface recesses and protrusions that form a tread pattern are omitted from the tire molding surface. FIG. 3 is a breakdown perspective view illustrating an overview of an exhaust groove and a blade of the tire vulcanization mold depicted in FIG. 2. FIG. 4 is a cross-sectional view taken along A-A of FIG. 2, FIG. 5 is a cross-sectional view taken along B-B of FIG. 2, and FIG. 6 is a cross-sectional view taken along C-C of FIG. 5.

The tire vulcanization mold 10 includes a tread mold 2 having a tread molding surface and a side mold 3 having a side wall molding surface. The tire vulcanization mold 10 illustrated in FIG. 2 and in FIG. 4 represents the tread mold 2 having the tread molding surface that is a portion of the tire vulcanization mold 10.

The tire vulcanization mold 10 (hereinafter referred to as the "mold 10") is formed from an aluminum material or the like, and an inner circumferential side surface of the tread mold 2 is a tire molding surface (tread molding surface) 12. An exhaust groove 14 that is open is formed in plurality in the tire molding surface 12. A blade 17 is received and embedded in the exhaust groove 14.

The tire molding surface 12 side of the blade 17 embedded in the exhaust groove 14 is established as an upper side, and a back side of the exhaust groove 14 in a depth direction is established as a lower side. An upper edge surface of the blade 17 and the tire molding surface 12 are substantially at the same level. An exhaust hole 21 is provided extending from a first edge surface of the mold 10 toward a second edge surface. The exhaust hole 21 is connected to the exhaust groove 14, and connects the exhaust groove 14 and an exterior of the mold 10.

The exhaust groove 14 has an upper groove portion 15 and a lower side groove portion 16. Specifically, a length dimension (the dimension in a left-right direction in FIG. 2) of the exhaust groove 14 is reduced partway in a mold depth direction. Thereby, a long edge upper groove portion 15 positioned on a mold surface (tire molding surface 12) side, and a short edge lower side groove portion 16 positioned on a mold back surface 13 (see FIG. 4) side are formed. A depth dimension of each of the upper groove portion 15 and the lower side groove portion 16 is, for example, about 1 mm to 4 mm, and is preferably about 2 mm.

A thickness dimension t1 (width) of the upper groove portion 15 (see FIGS. 3, 7, and 8) is configured to be greater than a thickness dimension T (thickness) of the blade 17 (see FIG. 3), and a thickness dimension t2 (width) of the lower side groove portion 16 is configured to be less than or equal to the thickness dimension T (thickness) of the blade 17 (see FIG. 3). In other words, t1>T≥t2. The thickness dimension t1 of the upper groove portion 15 is, for example, configured to be about 0.005 mm to 0.1 mm greater than the thickness dimension T of the blade 17, and preferably about 0.06 mm (about 0.03 mm on each side) greater than the thickness dimension T of the blade 17. It is sufficient that the thickness dimension t2 (width) of the lower side groove portion 16 be configured to be less than the thickness dimension T of the blade 17 and, for example, the thickness dimension t2 is configured to be about 0 mm to 0.1 mm less than the thickness dimension T of the blade 17. Specifically, the thickness dimension t2 is preferably configured to be about 0.01 mm less than the thickness dimension T.

The blade 17 is formed from a thin plate of a metal such as stainless steel or the like. The blade 17 has a form corresponding to a general form of the upper groove portion 15 and the lower side groove portion 16 of the exhaust groove 14, when viewed as a side view from a D direction in FIG. 3. Specifically, the blade 17 has an upper portion 18 corresponding to the upper groove portion 15 and a lower side portion 19 corresponding to the lower side groove portion 16. A dimension of the upper portion 18 in the lengthwise direction of the blade 17 corresponds to a lengthwise direction of the upper portion 18 of the exhaust groove 14. In other words, a lengthwise dimension of the upper portion 18 of the blade is greater than a lengthwise dimension of the lower side portion 19 of the blade that extends along a lengthwise direction of the lower side groove portion 16. The thickness dimension T of the blade 17 is substantially constant.

As illustrated in FIGS. 5 and 6, when the blade 17 is received and embedded in the exhaust groove 14, the blade 17 is abutted against lengthwise direction edge surfaces 15a and 15a and bottom surface 15c of the upper groove portion 15, and against lengthwise direction edge surfaces 16a and 16a and thickness direction edge surfaces 16b and 16b of the lower side groove portion 16. In this embodiment, when the blade 17 is received and embedded in the exhaust groove 14, it is sufficient that the blade 17 is configured so as to be abutted against at least the bottom surface 15c of the upper groove portion 15 and the thickness direction edge surfaces 16b and 16b in the widthwise direction of the lower side groove portion 16. When received in the exhaust groove 14, a communicating portion 20 that connects the upper groove portion 15 and the lower side groove portion 16 is provided in the blade 17. In this embodiment, a communicating portion 20 is provided that is formed by notching a widthwise direction center portion of the blade 17. Specifically, the communicating portion 20 is formed in a portion of the blade 17 received in the lower side groove portion 16, and is formed so as to extend from an edge surface of an end of the blade 17 received in the lower side groove portion 16 to an interior of the blade 17.

Figure 7:
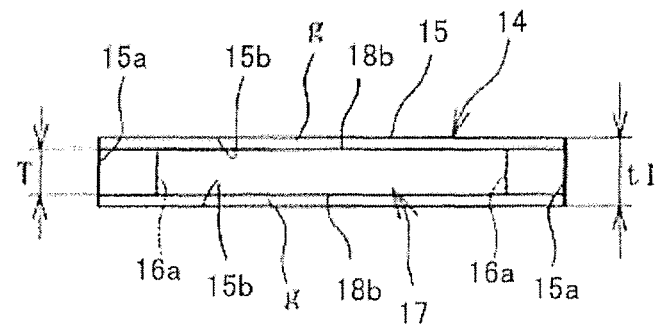
FIG. 7 is a plan view of the exhaust groove and the blade depicted in FIG. 3 when viewed from an opening of the exhaust groove.
Figure 8:
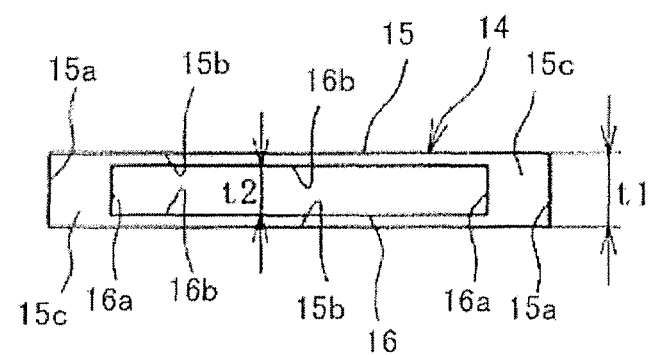
FIG. 8 is a plan view of the exhaust groove depicted in FIG. 3, where the blade is not embedded, when viewed from an opening of the exhaust groove.
Figure 9:
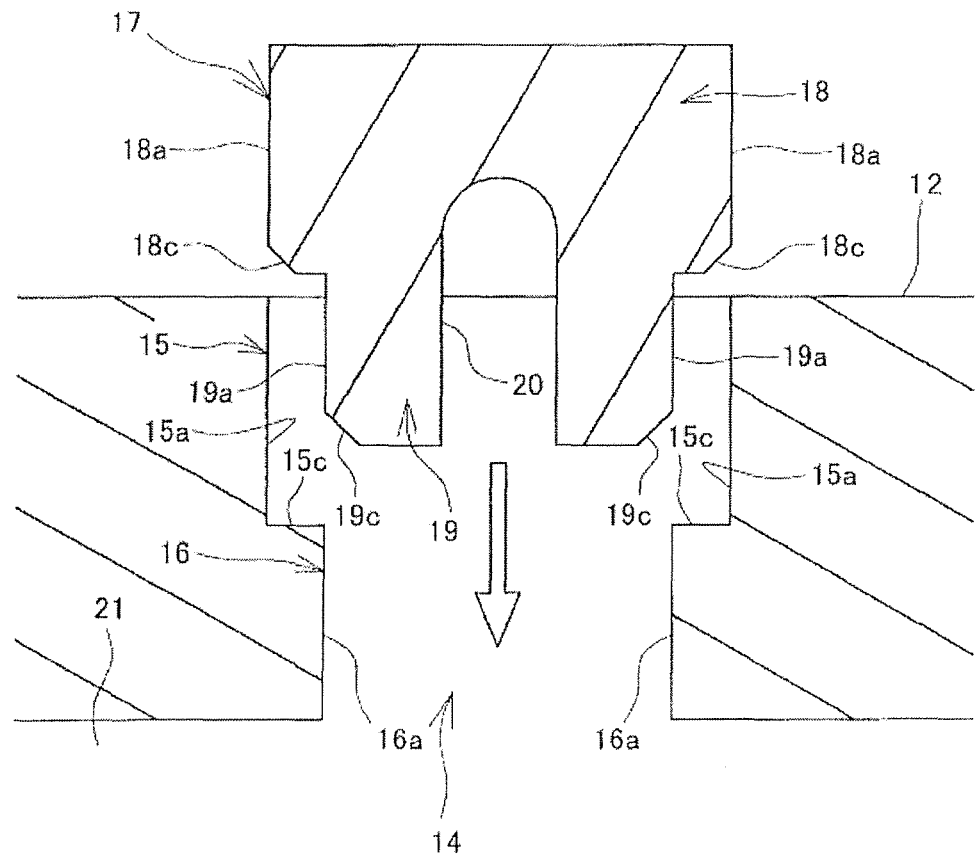
FIG. 9 is an explanatory drawing illustrating, as a side view, a state where the blade is being received in the exhaust groove.

FIG. 7 is a plan view of the exhaust groove 14 and the blade 17 depicted in FIG. 3 when viewed from an opening of the exhaust groove 14. FIG. 8 is a plan view of the exhaust groove 14 (where the blade 17 is not embedded) when viewed from an opening of the exhaust groove 14. FIG. 9 is an explanatory drawing illustrating, as a side view, a state where the blade 17 is being received in the exhaust groove 14.

As illustrated in FIG. 7, a small gap g (see FIG. 7) is formed between thickness direction edge surfaces 18b and 18b (see FIG. 7) of the upper portion 18 (see FIG. 3) of the blade 17 and thickness direction edge surfaces 15b and 15b (see FIGS. 7 and 8) of the upper groove portion 15. The small gap g has a dimension such that rubber (unvulcanized rubber of a green tire) in a fluid state due to high temperatures during vulcanization does not pass through while air a and/or gas is allowed to pass through and, for example, is configured to be about 0.02 mm to 0.05 mm. The small gap g is a structure that is in communication with the communicating portion 20. In other words, the communicating portion 20 extends from a lowest edge surface of the lower side portion 19 to the upper portion 18.

The upper groove portion 15 (the exhaust groove 14) can be formed with high precision, free of inconsistencies with respect to set dimensions, through cutting machining, electric discharge machining, and the like. The blade 17 can also be formed according to set dimensions through machining and the like. As a result, the small gap g can be formed precisely to target dimensions without inconsistencies in size.

The blade 17 received and embedded in the exhaust groove 14 is configured so as to be abutted against at least the bottom surface 15c of the upper groove portion 15 and the thickness direction edge surfaces 16b and 16b of the lower side groove portion 16. Therefore, the small gap g can be ensured between the thickness direction edge surfaces 15b and 15b of the upper groove portion 15 and the thickness direction edge surfaces 18b and 18b of the upper portion 18 of the blade 17 throughout an entire length of the lengthwise direction (long edge) of the upper groove portion 15 while the blade 17 is mainly held by the lower side groove portion 16. Thus, the exhaust groove 14 is provided with a structure including the upper groove portion 15 and the lower side groove portion 16 having a length dimension shorter than that of the upper groove portion 15; the upper groove portion 15 formed open to the tire molding surface 12 is utilized as effectively as possible; and an area of the small gap g that is open to the tire molding surface 12 is increased. Therefore, exhausting efficiency can be enhanced.

Accordingly, as illustrated in FIG. 5, the unnecessary air a and/or gas produced when vulcanizing a tire is evacuated from the tire molding surface 12 to the small gap g and the communicating portion 20, and out of the mold 10 via the exhaust hole 21. As a result, when vulcanizing a tire, it is possible to ensure stable exhaustion; also, when vulcanizing a tire, occurrences of vulcanization defects such as rubber filling shortages and the like can be prevented. When the communicating portion 20 is formed in the widthwise direction center portion of the blade 17 as in this embodiment, the communicating portion 20 can be enlarged easily and exhausting efficiency can be effectively enhanced.

In this embodiment, when the blade 17 is received and embedded in the exhaust groove 14, each of the lengthwise direction edge surfaces 18a and 18a of the upper portion 18 are configured so as to be abutted against the lengthwise direction edge surfaces 15a and 15a of the upper groove portion 15. Therefore, position aberration in the lengthwise direction of the blade 17 is restricted by the upper groove portion 15 and a stable small gap g is easily obtained between the blade 17 and the exhaust groove 14. Thus, when each of the lengthwise direction edge surfaces 18a and 18a of the upper portion 18 are abutted against the lengthwise direction edge surfaces 15a and 15a of the upper groove portion 15, lengthwise direction edge surfaces 19a and 19a of the lower side portion 19 need not be abutted against the lengthwise direction edge surfaces 16a and 16a of the lower side groove portion 16.

Additionally, as illustrated in FIG. 5, in this embodiment, chamfered portions 19c and 19c are formed at corners of lower sides of lengthwise direction edge surfaces 19a and 19a of the portion (lower side portion 19) of the blade 17 received in the lower side groove portion 16. Thus, when inserting the blade 17 as illustrated in FIG. 9, even if an edge surface of the end of the blade 17 contacts the bottom surface 15c of the upper groove portion 15, the chamfered portions 19c will contact the bottom surface 15c. Therefore, little or none of the mold base material will be scraped off due to the contact, thus preventing pieces of scraped off mold base material from accumulating in the exhaust groove 14. Furthermore, the blade 17 is guided by the chamfered portions 19c so as to be in alignment with the lower side groove portion 16, thus facilitating more precise insertion of the blade 17 into the exhaust groove 14.

Chamfered portions 18c and 18c may also be formed at corners of a lower side of the lengthwise direction edge surfaces 18a and 18a of a portion (the upper portion 18) of the blade 17 received in the upper groove portion 15. Thus, when impacting the blade 17 as illustrated in FIG. 9, even if an edge surface of the blade 17 contacts the opening of the upper groove portion 15, the chamfered portions 18c will contact the bottom surface 15c. Therefore, little or none of the mold base material will be scraped off due to the contact, thus preventing pieces of scraped off mold base material from accumulating in the exhaust groove 14.

First Modified Example

Figure 10:
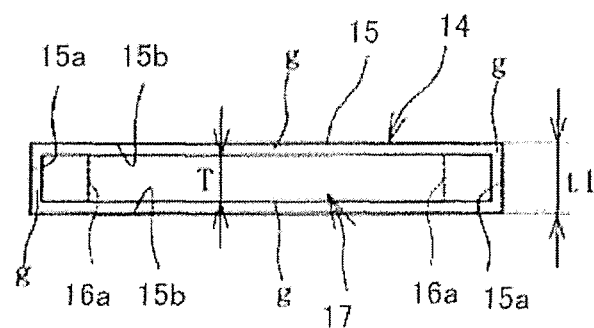
FIG. 10 is a plan view illustrating a modified example of the blade.
Figure 11:
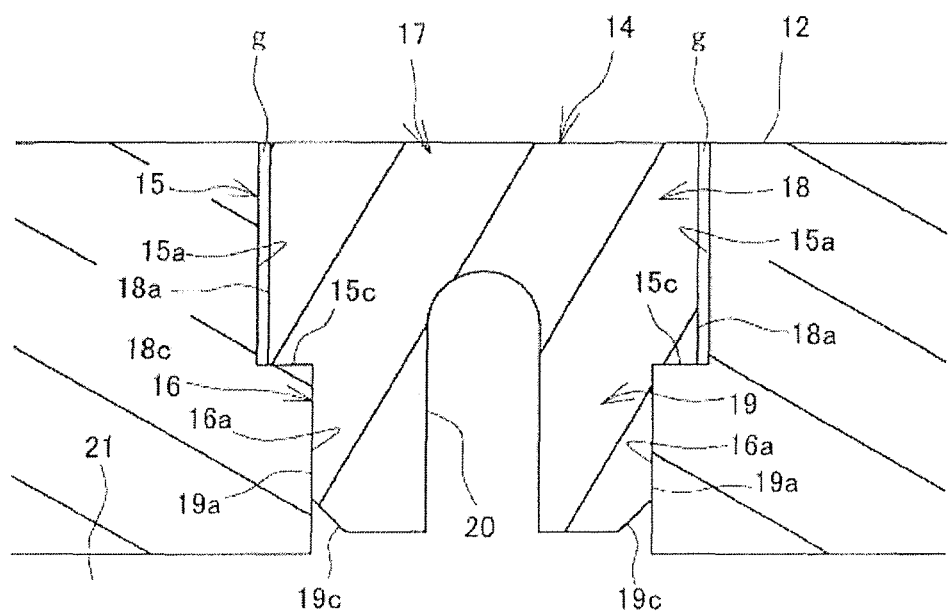
FIG. 11 is a cross-sectional view illustrating an interior of the exhaust groove of FIG. 10.

FIGS. 10 and 11 illustrate a first modified example of the blade 17. In the first modified example, in addition to the small gap g described in the embodiment described above, the small gap g is also formed between the lengthwise direction edge surfaces 15a and 15a of the upper groove portion 15 and the lengthwise direction edge surfaces 18a and 18a of the upper portion 18 of the blade 17. Thus, compared to the embodiment described above, the area of the small gap g that is open to the tire molding surface 12 can be increased. In the first modified example, the blade 17 is fixed/held by being abutted against the bottom surface 15c of the upper groove portion 15 and the lengthwise direction edge surfaces 16a and 16a and thickness direction edge surfaces 16b and 16b of the lower side groove portion 16.

Second Modified Example

Figure 12:
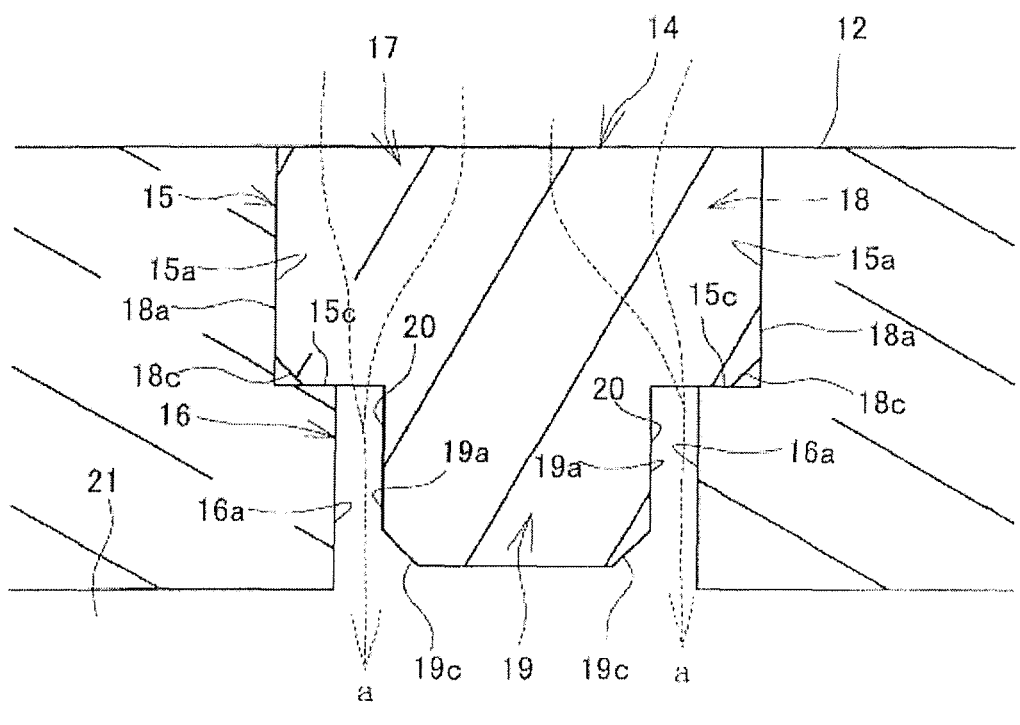
FIG. 12 is a cross-sectional view illustrating another modified example of the blade.
Figure 12:

As illustrated in FIG. 12, a blade 17 of the second modified example has the communicating portion 20 present on both lengthwise direction edges of the lower side portion 19 of the blade 17 and extending in the widthwise direction of the blade 17. Even when the communicating portion 20 is formed in this manner, the communicating portion 20 can be enlarged easily and, therefore, exhausting efficiency can be effectively enhanced. Furthermore, the communicating portion 20 provided in the widthwise direction center portion of the blade 17 as illustrated in FIG. 5, and the communicating portion 20 provided on both of the lengthwise direction edges of the lower side portion 19 of the blade 17 as illustrated in FIG. 12 can be simultaneously combined.

Third Modified Example

Figure 13:
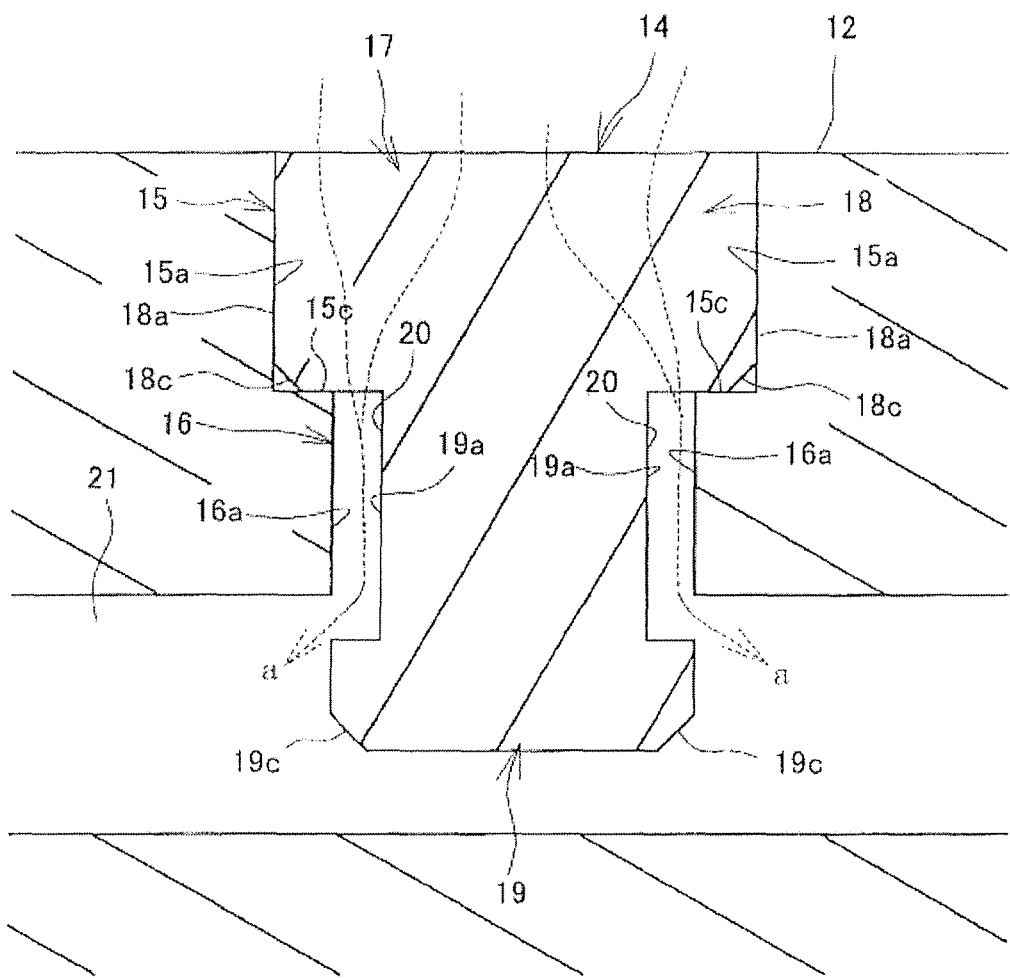
FIG. 13 is a cross-sectional view illustrating yet another modified example of the blade.

FIG. 13 illustrates a blade 17 of a third modified example. The blade 17 of the third modified example is provided with an expanded portion having a length equal to a distance between the lengthwise direction edge surfaces 16a and 16a on both sides of the lower side groove portion 16, on a lower edge of the lower side portion 19 of the blade 17 of the second modified example in FIG. 12. Specifically, a distance (lengthwise dimension) between both edges in the lengthwise direction of the blade 17 at a portion of the lower side portion 19 corresponding to the lower side groove portion 16 is less than the length dimension of the lower side groove portion 16, and a distance (lengthwise dimension) between both edges in the lengthwise direction of the blade 17 at the expanded portion is the same as the length dimension of the lower side groove portion 16. When using the blade 17 of the third modified example, when the blade 17 is received in the exhaust groove 14, the expanded portion contacts the lengthwise direction edge surfaces 16a and 16a of the lower side groove portion 16. Additionally, the chamfered portions 19c of the expanded portion contact the bottom surface 15c of the upper groove portion 15. As a result, regardless of whether the communicating portion 20 is provided on both of the lengthwise direction edges of the lower side portion 19, the blade 17 is aligned with the lower side groove portion 16 and is easily received with precision in the exhaust groove 14.

In the embodiment described above with regard to FIGS. 1-9, and in the first to third modified examples, the blade 17 is fixed/held by being received in the exhaust groove 14. However, in addition to being fixed/held via impacting, an adhesive may be interposed on the abutting surface of the blade 17 and the exhaust groove 14.

Figure 14:
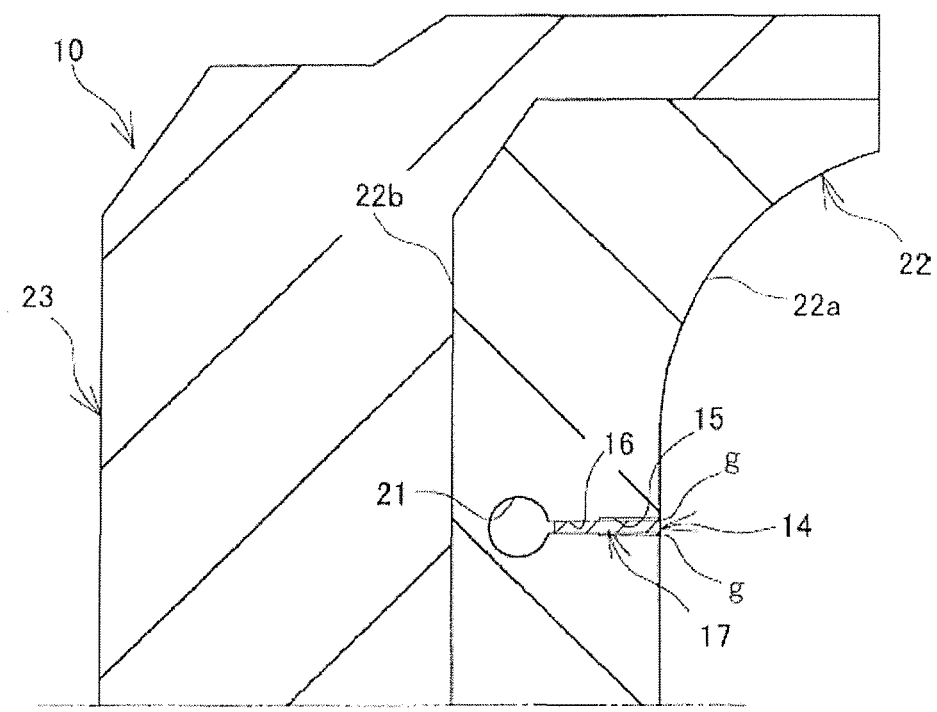
FIG. 14 is a cross-sectional view illustrating a different type of mold.

Also, with the mold 10 of the embodiment described above and in the first to third modified examples, the mold 10 was constituted by a single member as illustrated in FIG. 4. However, in addition, structures such as those illustrated in FIGS. 14 and 15, where a plurality of pieces 22 having a tire molding surface 22a is attached to a back block 23, can be applied to the mold 10. When using this type of mold 10, as illustrated in FIG. 14, the exhaust hole 21 is provided on a back surface 22b side of the piece 22, extending from a first edge surface of the piece 22 to a second edge surface so as to connect with the exhaust groove 14.

Figure 15:
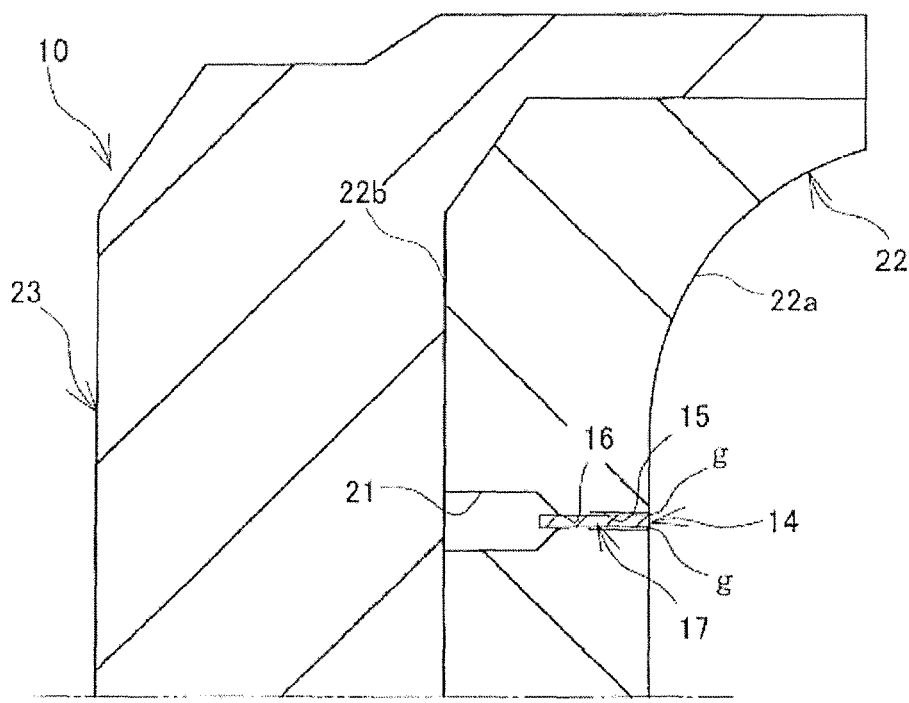
FIG. 15 is a cross-sectional view of a mold illustrating a modified example of the exhaust hole.

Alternately, as illustrated in FIG. 15, the exhaust hole 21 can be provided extending from the back surface 22b of the piece 22 toward the tire molding surface 22a so as to connect with the exhaust groove 14. Furthermore, with the mold 10 illustrated in FIG. 4, the exhaust hole 21 can be provided extending from the back surface 13 of the mold 10 toward the tire molding surface 12 so as to connect with the exhaust groove 14.

Also, in the embodiment described above and in the first to third modified examples, an orientation of the exhaust groove 14 with respect to the exhaust hole 21 is not particularly limited. For example, the exhaust groove 14 can be formed so that the thickness direction of the exhaust groove 14 faces an extending direction of the exhaust hole 21. Additionally, in the embodiment described above and in the first to third modified examples, the blade 17 has a form in which an upper edge surface thereof does not protrude from the tire molding surface 12, but the blade 17 may protrude from the tire molding surface 12. In other words, the blade 17 can be used as a siping blade for forming sipes in the tire.

Furthermore, according to the embodiment and the modified examples, the length dimension of the exhaust groove 14 is reduced partway in the mold depth direction. Thus, the exhaust groove 14 has a long edge upper groove portion 15 positioned on a mold surface side, and a short edge lower side groove portion 16 positioned on a mold back surface side. The thickness dimension of the upper groove portion 15 is configured to be greater than the thickness dimension of the blade 17, and the thickness dimension of the lower side groove portion 16 is configured to be less than or equal to the thickness dimension of the blade 17. When the blade 17 is received and embedded in the exhaust groove 14, the blade 17 is abutted against at least the bottom surface 15c of the upper groove portion 15 and the thickness direction edge surfaces 16b and 16b of the lower side groove portion 16. Thus, while holding the blade 17 received in the exhaust groove 14, the small gap g can be ensured between the upper groove portion 15 and the blade 17 throughout the entire length in the lengthwise direction of the upper groove portion 15. The communicating portion 20 that connects the upper groove portion 15 and the lower side groove portion 16 is provided in the blade 17. Therefore, unnecessary air and/or gas produced when vulcanizing the green tire G can be evacuated through the small gap g between the blade 17 and the upper groove portion 15 and the communicating portion 20, and out of the mold 10 via the exhaust hole 21 formed in the mold 10. Thus, the exhaust groove 14 is provided with a structure including the upper groove portion 15 and the lower side groove portion 16. The upper groove portion 15 that is open to the tire molding surface 12 is utilized as effectively as possible, and the area of the small gap g that is open to the tire molding surface 12 is increased. Therefore, exhausting efficiency can be enhanced.

In addition, the mold 10 can be configured so that the blade 17 is abutted against the lengthwise direction edge surfaces 15a and 15a of the upper groove portion 15 when the blade 17 is received and embedded in the exhaust groove 14. As a result of this configuration, position aberration in the lengthwise direction of the blade 17 is restricted by the upper groove portion 15 and, therefore, a stable small gap g is easily obtained between the blade 17 and the exhaust groove 14.

Chamfered portions 19c and 19c can also be formed at corners of a lower side of both of the lengthwise direction edges of the portion of the blade 17 received in the lower side groove portion 16. The chamfered portions 19c and 19c facilitate insertion of the blade 17 in the lower side groove portion 16 with precision. Additionally, when inserting the blade 17, even if an edge surface of the blade 17 contacts the bottom surface of the upper groove portion 15, the exhaust groove 14 will not be easily scraped.

Furthermore, the communicating portion 20 can be formed in a lengthwise direction center portion of the blade 17 in the mold 10. The communicating portion 20 can also be formed on both edges in the lengthwise direction of the blade 17. As a result of these configurations, the communicating portion 20 is enlarged easily and, therefore, exhausting efficiency is effectively enhanced.

It should also be understood that the tire vulcanization mold described above is not limited to the above embodiment and modified examples, but may be improved or modified in various ways so long as these improvements or modifications remain within the scope of the present technology.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A tire vulcanization mold for vulcanizing a green tire comprising:
   a side mold having a side wall molding surface; and
   a tread mold having a tread molding surface, the tread mold including an elongated exhaust groove open to the tread molding surface, a blade that is configured to enter the exhaust groove to create a gap between the blade and a portion of the tread mold defining the exhaust groove, and an exhaust hole connecting the exhaust groove and an exterior of the tire vulcanization mold;
   a length of the exhaust groove being reduced partway in a mold depth direction of the tread mold, such that the exhaust groove includes an upper groove portion having an upper length and a lower groove portion having a lower length, the upper groove portion being positioned in a mold surface side of the tread mold that includes the tread molding surface and the lower groove portion being positioned in a mold back surface side of the tread mold, the lower length being shorter than the upper length;
   a width of the upper groove portion being greater than a thickness of the blade, and a width of the lower groove portion being less than or equal to the thickness of the blade;
   the blade being abutted against at least a bottom surface of the tread mold defining the upper groove portion and edge surfaces of the tread mold defining both sides of the lower groove portion in a widthwise direction of the lower groove portion while the blade is embedded in the exhaust groove; and
   the blade includes a communicating portion that communicatively connects the upper groove portion and the lower groove portion.

2. The tire vulcanization mold according to claim 1, wherein
   the blade is further abutted against edge surfaces of the tread mold defining both sides of the upper groove portion in a lengthwise direction while the blade is embedded in the exhaust groove.

3. The tire vulcanization mold according to claim 1, wherein
   the blade includes chamfered portions formed at corners of edges of both sides of the blade in a lengthwise direction of a portion of the blade that is received in the lower groove portion.

4. The tire vulcanization mold according to claim 1, wherein
   a portion of the blade received in the lower groove portion defines the communicating portion which extends from an edge surface of an end of the portion of the blade received in the lower groove portion toward an interior of the blade.

5. The tire vulcanization mold according to claim 4, wherein
   the communicating portion is configured as a notch in the blade.

6. The tire vulcanization mold according to claim 4, wherein
   the communicating portion extends in a widthwise direction of the blade from a center portion of the blade.

7. The tire vulcanization mold according to claim 1, wherein
   the communicating portion extends in a widthwise direction of the blade along opposite edges of the blade.

8. The tire vulcanization mold according to claim 1, wherein
   the blade includes an upper portion and a lower portion corresponding to the upper groove portion and the lower groove portion, respectively, of the exhaust groove in which the blade is received; and
   an upper width of the upper portion of the blade corresponds to the upper length of the upper groove portion and a lower width of the lower portion of the blade corresponds to the lower length of lower groove portion, such that the upper width is greater than the lower width.

9. The tire vulcanization mold according to claim 8, wherein
   the lower portion of the blade includes an expanded portion that is configured to protrude into the exhaust hole while the blade is received in the exhaust groove; and
   a distance between both edges in a lengthwise direction of the blade in a portion of the blade corresponding to the lower groove portion is less than a length of the exhaust groove in the lower groove portion, and a distance between both edges in the lengthwise direction of the blade in the expanded portion is the same as the length of the exhaust groove in the lower groove portion.

10. The tire vulcanization mold according to claim 2, wherein
the blade includes chamfered portions formed at corners of edges of both sides of the blade in a lengthwise direction of a portion of the blade that is received in the lower groove portion.

11. The tire vulcanization mold according to claim 2, wherein
a portion of the blade received in the lower groove portion defines the communicating portion which extends from an edge surface of an end of the portion of the blade received in the lower groove portion toward an interior of the blade.

12. The tire vulcanization mold according to claim 3, wherein
a portion of the blade received in the lower groove portion defines the communicating portion which extends from an edge surface of an end of the portion of the blade received in the lower groove portion toward an interior of the blade.

13. The tire vulcanization mold according to claim 10, wherein
a portion of the blade received in the lower groove portion defines the communicating portion which extends from an edge surface of an end of the portion of the blade received in the lower groove portion toward an interior of the blade.

14. The tire vulcanization mold according to claim 11, wherein
the communicating portion is configured as a notch in the blade.

15. The tire vulcanization mold according to claim 12, wherein
the communicating portion is configured as a notch in the blade.

16. The tire vulcanization mold according to claim 13, wherein
the communicating portion is configured as a notch in the blade.

17. The tire vulcanization mold according to claim 11, wherein
the communicating portion extends in a widthwise direction of the blade from a center portion of the blade.

18. The tire vulcanization mold according to claim 12, wherein
the communicating portion extends in a widthwise direction of the blade from a center portion of the blade.

19. The tire vulcanization mold according to claim 13, wherein
the communicating portion extends in a widthwise direction of the blade from a center portion of the blade.

20. The tire vulcanization mold according to claim 2, wherein
the communicating portion extends in a widthwise direction of the blade along opposite edges of the blade.

* * * * *